(12) United States Patent
Numata et al.

(10) Patent No.: US 6,215,201 B1
(45) Date of Patent: Apr. 10, 2001

(54) POWER WINDOW SWITCH DEVICE

(75) Inventors: Hidetaka Numata; Mikio Onodera; Katsuya Mitsuzuka; Ken Mizuta, all of Miyagi-ken (JP)

(73) Assignee: Alps Electrics Co., Ltd., Tokyo (JP)

( * ) Notice: Subject to any disclaimer, the term of this patent is extended or adjusted under 35 U.S.C. 154(b) by 0 days.

(21) Appl. No.: 09/317,658

(22) Filed: May 24, 1999

(30) Foreign Application Priority Data

May 25, 1998 (JP) .................................................. 10-143091

(51) Int. Cl.[7] .................................................. E05F 15/10
(52) U.S. Cl. .................................. 307/10.1; 49/26; 49/28; 318/282
(58) Field of Search ............................... 307/10.1; 49/26, 49/28; 318/118, 280, 282, 434

(56) References Cited

U.S. PATENT DOCUMENTS

| | | | | |
|---|---|---|---|---|
| 4,773,183 | * | 9/1988 | Okushima et al. ........................ | 49/28 |
| 4,990,835 | * | 2/1991 | Onishi et al. .......................... | 318/118 |
| 5,832,664 | * | 10/1998 | Tajima et al. ........................... | 49/26 |
| 6,054,822 | * | 4/2000 | Harada ................................. | 318/434 |

* cited by examiner

Primary Examiner—Albert W. Paladini
(74) Attorney, Agent, or Firm—Brinks Hofer Gilson & Lione

(57) ABSTRACT

Disclosed is a power window switch device capable of informing the driver of the occurrence of a malfunction in the opening and closing of power windows. A power window switch device includes a plurality of pairs of power window switches individually connected to a plurality of power window motors, a detecting section for detecting a malfunction in the opening and closing of the power windows and outputting a malfunction signal, a control section for detecting the malfunction signal output from the detecting section and outputting an actuator drive signal, and a vibrating device driven by the drive signal output from the control section. The vibration of the vibrating device is transmitted to the finger operating the power window switches to thereby inform the driver of the occurrence of a malfunction.

10 Claims, 3 Drawing Sheets

POWER WINDOW SWITCH DEVICE

BACKGROUND OF THE INVENTION

1. Field of the Invention

The present invention relates to a power window switch device and, in particular, to a malfunction detecting means which informs the driver of any malfunction in the opening and closing of the power windows.

2. Description of the Related Art

Presently, many automobiles are equipped with power windows which are opened and closed by the driving force of a motor. In an automobile equipped with power windows, all the windows can be opened and closed by operating a power window switch device provided at the driver's seat. Thus, even when the driver is alone in the automobile, he or she can open and close the rear seat windows without having to leave the driver's seat. Thus, compared to an automobile not equipped with power windows, an automobile so equipped is more convenient for to the driver.

On the other hand, in an automobile equipped with power windows, in which all the windows can be opened and closed with the power window switch device provided at the driver's seat, a danger exists that the windows at the rear seats will be closed unexpectedly and that a part of the body, clothing, etc., of a person sitting in a rear seat will be caught by the window.

There has been proposed a power window switch device which utilizes the fact that whenever a power window motor is blocked, the motor current rapidly increases. That is, the device detects an increase in motor current so as to detect a motor lock condition. It then emits an alarm sound to inform the driver of the occurrence of the malfunction.

However, the above conventional technique, which informs the driver of the occurrence of a malfunction through an alarm sound, has a problem in that it does not function as an alarm device for a driver who is hard of hearing. Furthermore, for a normal driver, the alarm sound is hard to hear when the environment is very noisy, so that it is difficult to quickly and reliably inform the driver of the occurrence of a malfunction.

SUMMARY OF THE INVENTION

The present invention has been made with a view toward solving the above problem in the art. Accordingly, it is an object of the present invention to provide a power window device which is capable of quickly and reliably informing the driver of the occurrence of a malfunction in the opening and closing of the power windows.

To achieve the above object, there is provided, in accordance with the present invention, a power window switch device comprising a plurality of power window switches connected to a plurality of power window motors, a plurality of knobs for operating the power window switches, a detecting section for detecting a malfunction in the opening and closing of the power windows to output a malfunction signal, a control section for outputting an vibrating device drive signal by detecting the malfunction signal output from the detecting section, and a vibrating device driven by the vibrating device drive signal.

When the power window switch device is thus equipped with a vibrating device, and any malfunction occurring during the operation of the power windows is detected to cause the vibrating device to be driven, it is possible to directly impart to the finger operating the knob a vibration so as to indicate that a malfunction has occurred; it is therefore possible to inform the driver of the occurrence of the malfunction quickly and reliably even when he or she is hard of hearing or when the environment is very noisy. Thus, it is possible to quickly perform the necessary operations to correct the malfunction in the opening and closing of the power windows, whereby serious accidents can be prevented.

DESCRIPTION OF THE PREFERRED EMBODIMENT

Figure 1:
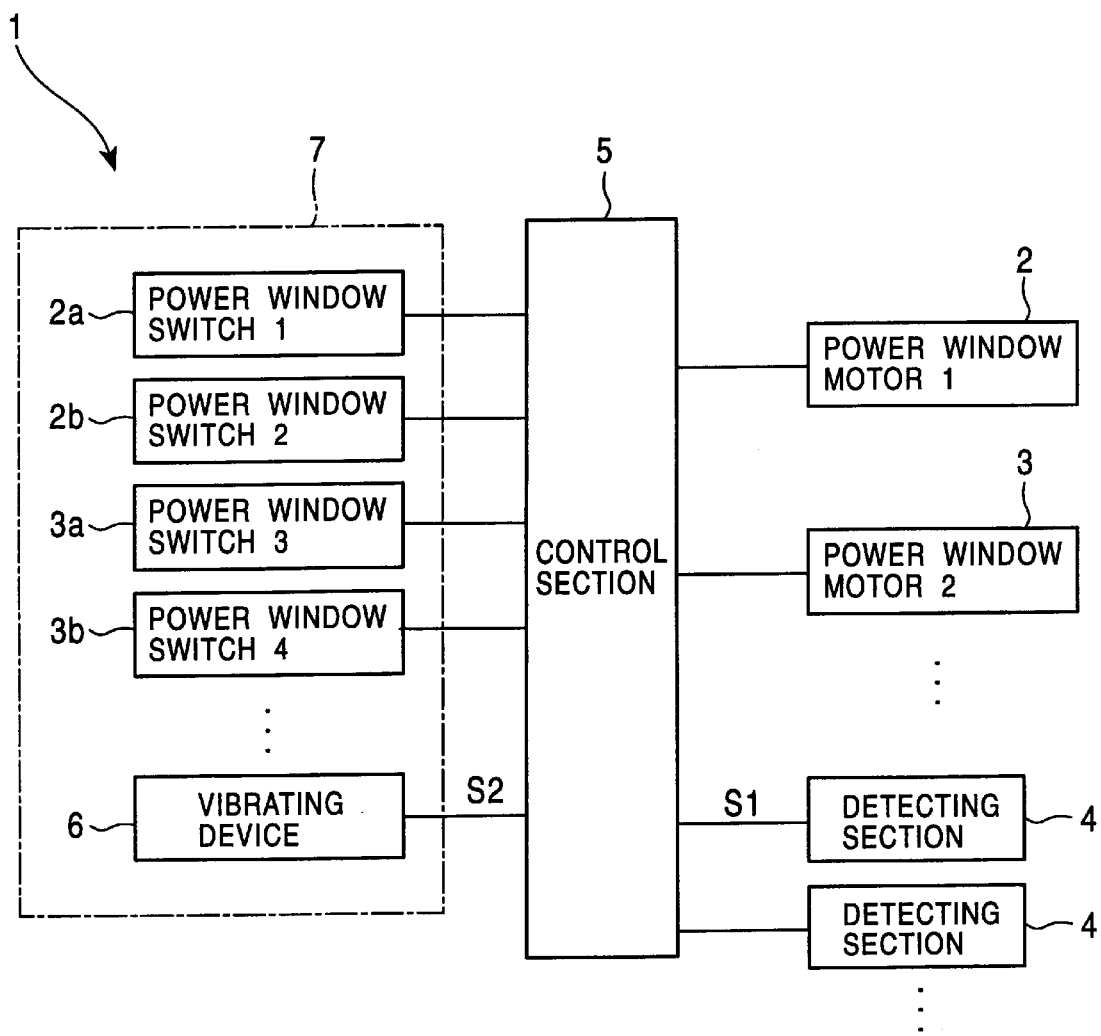
FIG. 1 is a block diagram showing the construction of a power window switch device according to an embodiment of the present invention.
Figure 2:
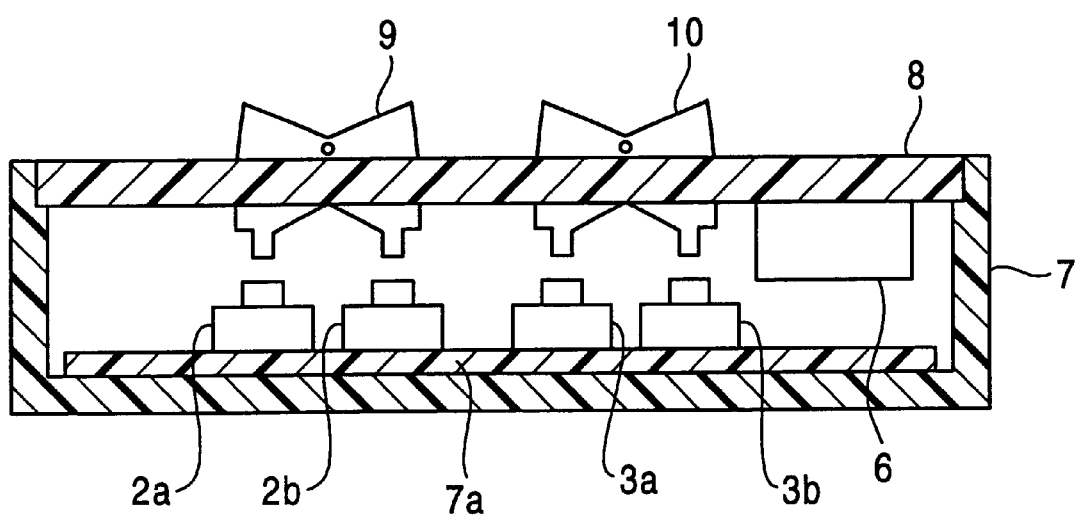
FIG. 2 is a sectional view showing the essential part of a switch box applied to the power window switch device of this embodiment.
Figure 3:
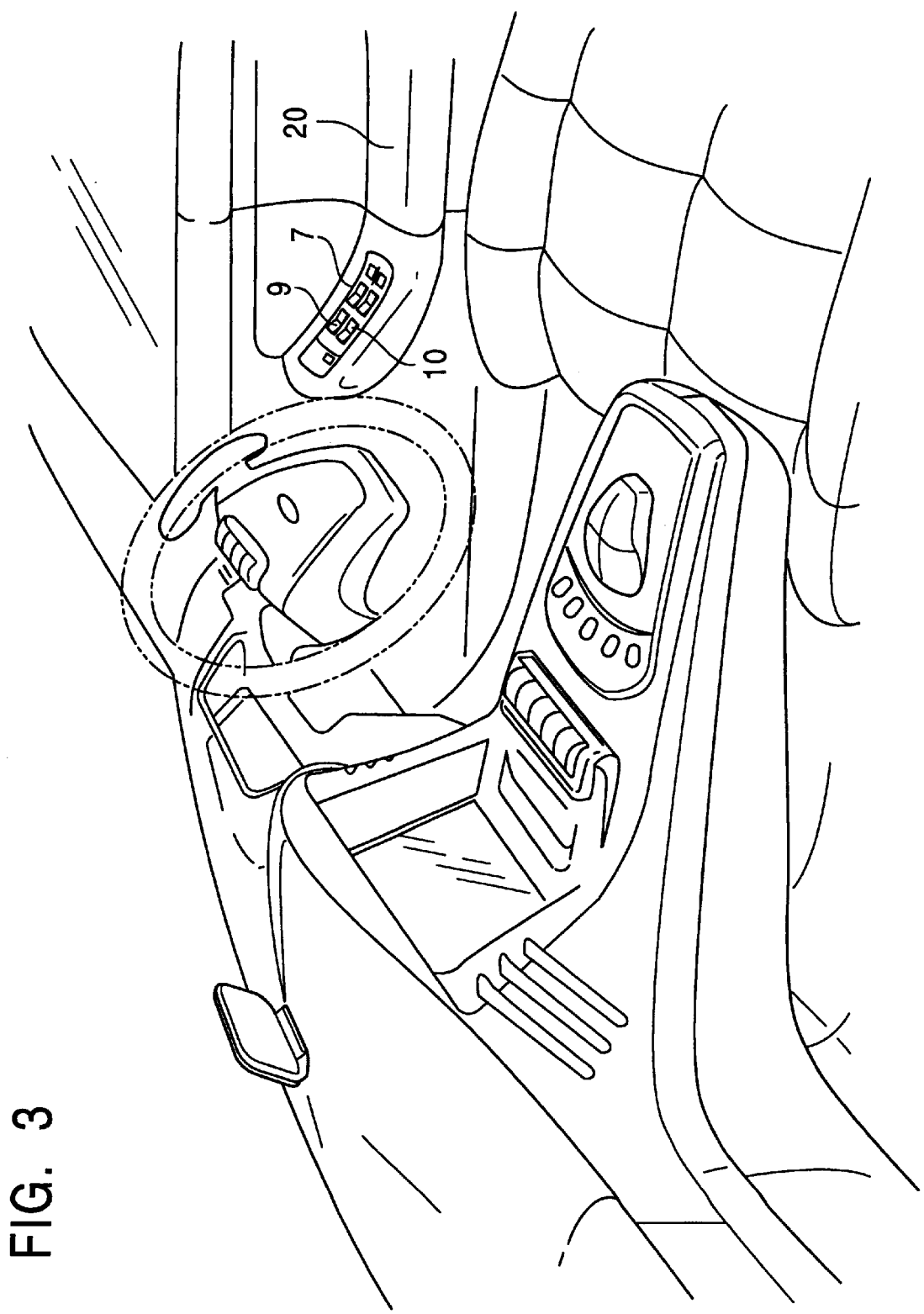
FIG. 3 is an internal view of an automobile showing where the switch box is installed.

A power window switch device according to an embodiment of the present invention will be described with reference to FIGS. 1 through 3. FIG. 1 is a block diagram showing the construction of a power window switch device according to the embodiment; FIG. 2 is a sectional view showing the essential part of a switch box applied to the power window switch device of this embodiment; and FIG. 3 is an internal view of an automobile showing where the switch box is installed.

As shown in FIG. 1, the power window switch device 1 of this embodiment mainly comprises a plurality of pairs (two pairs, in the example shown in FIG. 1) of power window switches 2a, 2b and 3a, 3b that are individually connected to a plurality of (two, in the example shown in FIG. 1) power window motors 2 and 3, a detecting section 4 for detecting a malfunction in the opening and closing of the power windows to output a malfunction signal S1, a control section 5 for detecting the malfunction signal S1 output from the detecting section 4 to output an actuator drive signal S2, and a vibrating device 6 driven by the drive signal S2 output from the control section 5.

The power window switches 2a and 3a are the switches for raising the windows, and the power window switches 2b and 3b are the switches for lowering the windows. As shown in FIG. 2, these power window switches are mounted in a predetermined arrangement to a wiring board accommodated in a switch box 7, and are selectively operated by means of first and second knobs 9 and 10 that are pivotally mounted to a covering plate 8 of the switch box 7.

When the left-hand end of the first knob 9 is depressed, the first switch 2a for raising windows connected to the first power window motor 2 is turned on, and the window at the driver's seat, for example, is raised. When the right-hand end of the first knob 9 is depressed, the second switch 2b for lowering windows connected to the first power window motor 2 is turned on, and the window at the driver's seat, for example, is lowered. When the left-hand end of the second knob 10 is depressed, the third switch 3a for raising windows connected to the second power window motor 3 is turned on, and the window at the rear seat on the driver's seat side is raised. When the right-hand end of the second knob 10 is depressed, the fourth switch 3b for lowering windows connected to the second power window motor 3 is turned on, and the window at the rear seat on the driver's seat side is lowered.

The first and second knobs 9 and 10 are equipped with an automatic restoring mechanism. When the depression of the knobs is canceled, the knobs are automatically restored to the neutral positions, and the switches 2a, 2b, 3a and 3b are automatically turned off to automatically stop the ascent or descent of the windows.

The detecting section 4 for detecting a malfunction in the opening and closing of the power windows may, for example, be of the type which detects an increase in the motor current supplied to the power window motors or of the type which detects an increase in the stress acting on the members for raising and lowering the windows. Due to its simple construction and high detection accuracy, the type which detects an increase in the motor current is particularly suitable. When the detecting section 4 is of the type which detects an increase in the motor current supplied to the power window motors, one detecting section 4 is provided for each motor.

Due to its simple construction, the vibrating device 6 is preferably of the type which uses a solenoid or a piezoelectric element as the vibration source. Apart from this, it is also possible to use a device in which a weight is eccentrically mounted to the motor shaft, or a device in which a weight is mounted to the forward end of an elastic member consisting of a ferromagnetic material and in which the elastic member is excited by an electromagnet. As shown in FIG. 2, this vibrating device 6 is mounted to the inner side of the covering plate 8, to which the knobs 9 and 10 are mounted.

While in the example shown in FIG. 2 the vibrating device 6 is directly mounted to the inner side of the covering plate 8, it is also possible to provide a vibrating plate (not shown) on the inner surface of the covering plate 8, and attach the vibrating device 6 to the vibrating plate so that a large vibration may be imparted to the finger by using a small vibrating device.

Further, while in the example shown in FIG. 2, only one vibrating device 6 is provided in the switch box 7, it is naturally also possible to provide a plurality of vibrating devices 6 in the switch box 7. In this case, it is particularly desirable to adjust the positions of the vibrating devices 6 in relation to the positions of the knobs 9 and 10 and the switches 2a, 2b, 3a and 3b in order that the relationship between the switch being operated and the window in which the malfunction has occurred may be more clearly recognized by the driver.

The control section 5 comprises by a microcomputer. Drive signal S2 of the vibrating device 6 output from the control section 5 can be of a constant level and mode, and independent of malfunction signal S1 output from the detecting section 4. It is also possible to make at least either the level or the mode variable in accordance with the level of the malfunction signal S1. When either the level or the mode of the drive signal S2 or both of them are made variable in accordance with the level of the malfunction signal S1, it is possible for the driver to gradually recognize the occurrence of the malfunction at earlier stage, so that he or she can take the necessary measures for eliminating the malfunction in a calm manner, thereby providing a further improvement in terms of safety.

Further, when a plurality of detecting sections 4 are provided, it is possible to output a drive signal S2 of a different level or mode from the control section 5 in accordance with the detecting section 4 outputting malfunction signal S1. For example, when the detecting section 4 detects an increase in the motor current supplied to the power window motor, and there are provided a plurality of detecting sections 4 for the power window motors, the detecting section 4 outputting the malfunction signal S1 is determined by the control section 5, and it is possible to output from the control section 5 a predetermined peculiar drive signal S2 with respect to the detecting section 4 concerned. This enables the driver to immediately recognize the window where malfunction in the opening and closing has occurred, whereby it is possible to construct a power window system which is better yet in terms of safety.

Further, when a plurality of vibrating devices 6 are provided in the switch box 7, it is possible to make the vibration level or the vibration mode or both of them variable for each vibrating device 6. In this case also, it is also possible for the driver to more clearly recognize the relationship between the switch being operated and the window where a malfunction in opening and closing has occurred, so that it is possible to take the necessary measures for eliminating the malfunction with respect to the window further improvement in terms of safety.

As shown in FIG. 3, the switch box 7 is mounted to the armrest 9 of the driver's seat of an automobile. Thus, in an automobile in which the steering wheel is on the right-hand side, the knobs 9 and 10 are mainly operated by the right hand of the driver, and in an automobile in which the steering wheel is on the left-hand side, the knobs 9 and 10 are mainly operated by the left hand of the driver.

The operation and advantages of the power window switch device 1 of this embodiment, constructed as described above, will be described with reference to the case in which the left-hand end of the second knob 10 is depressed to raise the window at the rear seat on the driver's seat side.

When the driver depresses the left-hand end of the second knob 10 provided in the switch box 7, the third switch 3a for raising the window connected to the second power window motor 3 is turned on, and the window at the rear seat on the driver's seat side is raised. If, at this time, a part of the body of a passenger or clothing is caught between the window and the window frame of the vehicle body, the second power window 3 is blocked, and the motor current flowing through the motor 3 rapidly increases. This change in the motor current is detected by the detecting section 4 and an output signal (malfunction signal S1) from the detecting section 4 is input to the control section 5.

When a malfunction signal S1 of a level not lower than a predetermined level is input, the control section 5 determines that a malfunction in opening and closing has occurred in the window and outputs drive signal S2 for the vibrating device 6, whereby the vibrating device 6 provided in the switch box 7 starts to vibrate. The vibration of the vibrating device 6 is transmit ted to the finger of the driver through the covering plate 8 of the switch box 7 and the knob 10, and the driver can be made aware of the occurrence of a malfunction in the opening and closing of the window at the rear seat on the driver's seat side.

In this way, in the power window switch 1 of this embodiment, the driver is informed of the occurrence of a malfunction in the opening and closing of windows through vibration and is made aware of the window where the malfunction has occurred by the power window switch being operated, so that even when the driver is hard of hearing or when the environment is very noisy, the driver can be quickly and reliably informed of the occurrence of a malfunction.

When the driver has been informed of the occurrence of a malfunction in the opening and closing of the power windows, he or she releases his or her finger from the left-hand end of the second knob 10 being operated and moves it to the right-hand end of the same knob 10, and depresses that end, whereby it is possible to lower the window at the rear seat on the driver's seat side. Due to this arrangement, the part of the human body or clothing that has been caught is quickly released, and serious accidents can be prevented.

While the above embodiment has been described with reference to the case in which a part of the human body or clothing is caught between the window frame and the window pane, it is also possible to inform the driver of the occurrence of a malfunction in the case in which an outside object is caught between the window frame and the window glass, and in the case in which the power windows themselves are out of order and cannot be normally opened or closed.

As described above, in the power window switch device of the present invention, the driver is informed of the occurrence of a malfunction in the opening and closing of windows through vibration, so that even when the driver is hard of hearing or when the environment is very noisy, the driver can be quickly and reliably made aware of the occurrence of a malfunction. Thus, it is possible to take the necessary measures to eliminate the malfunction in the opening and closing of the power windows, whereby it is possible to prevent serious accidents or damage to the automobile.

What is claimed is:

1. A power window switch device comprising a plurality of power window switches connected to a plurality of power window motors, a plurality of knobs for operating the power window switches, a detecting section for detecting a malfunction in the opening and closing of the power windows to output a malfunction signal, a control section for outputting a vibrating device drive signal by detecting the malfunction signal output from the detecting section, and a vibrating device driven by the vibrating device drive signal output from the control section.

2. A power window switch device according to claim 1, wherein the vibration level and/or vibration mode of the vibrating device is varied depending on the level of the malfunction signal output from the detecting section.

3. A power window switch device according to claim 1, wherein the vibrating device is a solenoid.

4. A power window switch device according to claim 1, wherein the vibrating device is a piezoelectric element.

5. A power window switch device according to claim 1, wherein the detecting section detects a malfunction in the opening and closing of the power windows by an increase in the motor current of the power window motors and outputs a malfunction signal.

6. A power window switch device according to claim 5, wherein the vibration level and/or vibration mode of the vibrating device is varied depending on the level of the malfunction signal output from the detecting section.

7. A power window switch device according to claim 1, wherein the detecting section is provided for each of the plurality of power window motors.

8. A power window switch device according to claim 7, wherein there are provided a plurality of said vibrating devices, which are respectively related to the plurality of power window switches.

9. A power window switch device according to claim 7, wherein the control section transmits a drive signal which generates a different vibration level and/or different vibration mode depending on the malfunction signal output from the detecting section.

10. A power window switch device according to claim 7, wherein the vibration level and/or vibration mode of the vibrating device is varied depending on the level of the malfunction signal output from the detecting section.

* * * * *

UNITED STATES PATENT AND TRADEMARK OFFICE
CERTIFICATE OF CORRECTION

PATENT NO.     : 6,215,201 B1
DATED          : April 10, 2001
INVENTOR(S)    : Hidetaka Numata et al.

It is certified that error appears in the above-identified patent and that said Letters Patent is hereby corrected as shown below:

<u>Title page,</u>
Item [73], delete "Electrics" and substitute -- Electric -- in its place.

Signed and Sealed this

Second Day of April, 2002

Attest:

JAMES E. ROGAN
*Attesting Officer*    *Director of the United States Patent and Trademark Office*